(12) United States Patent
Haribhatt et al.

(10) Patent No.: US 9,105,090 B2
(45) Date of Patent: Aug. 11, 2015

(54) WIDE-ANGLE LENS IMAGE CORRECTION

(75) Inventors: Akshayakumar Haribhatt, Bangalore (IN); Rajesh Vijayakumar, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 964 days.

(21) Appl. No.: 13/181,610

(22) Filed: Jul. 13, 2011

(65) Prior Publication Data

US 2013/0016918 A1    Jan. 17, 2013

(51) Int. Cl.
*G06K 9/00*     (2006.01)
*G06T 5/00*     (2006.01)

(52) U.S. Cl.
CPC ..................... *G06T 5/006* (2013.01)

(58) Field of Classification Search
USPC ......................... 382/275, 104, 293
See application file for complete search history.

(56) References Cited

U.S. PATENT DOCUMENTS

| | | | |
|---|---|---|---|
| 5,818,527 | A | 10/1998 | Yamaguchi et al. |
| 6,806,903 | B1 | 10/2004 | Okisu et al. |
| 7,116,781 | B2 | 10/2006 | Rhoads |
| 7,570,280 | B2 | 8/2009 | Ozaki |
| 7,576,767 | B2 | 8/2009 | Lee et al. |
| 2005/0058360 | A1 | 3/2005 | Berkey et al. |
| 2005/0195295 | A1 | 9/2005 | Kawai |
| 2006/0056056 | A1 | 3/2006 | Ahiska et al. |
| 2008/0166043 | A1 | 7/2008 | Bassi et al. |
| 2009/0002523 | A1 | 1/2009 | Maekawa |
| 2009/0059040 | A1 | 3/2009 | Kamon |
| 2009/0059041 | A1 | 3/2009 | Kwon |
| 2010/0002071 | A1 | 1/2010 | Ahiska |
| 2010/0165104 | A1* | 7/2010 | Fujita et al. ................... 348/148 |
| 2010/0223225 | A1 | 9/2010 | Vigoda et al. |
| 2011/0122298 | A1 | 5/2011 | Takahashi et al. |
| 2011/0249153 | A1* | 10/2011 | Hirooka et al. ............... 348/241 |
| 2012/0114262 | A1* | 5/2012 | Yu et al. ........................ 382/254 |
| 2012/0257009 | A1* | 10/2012 | Lee et al. ......................... 348/36 |

FOREIGN PATENT DOCUMENTS

| | | |
|---|---|---|
| EP | 1657675 A1 | 5/2006 |
| EP | 2009590 A1 | 12/2008 |
| WO | WO-2008086078 A1 | 7/2008 |
| WO | WO-2010017533 A2 | 2/2010 |

OTHER PUBLICATIONS

International Search Report issued in International Application No. PCT/US2012/046357 on Oct. 11, 2012 and mailed Oct. 18, 2012.

(Continued)

*Primary Examiner* — Wesley Tucker
(74) *Attorney, Agent, or Firm* — Patent Capital Group

(57) ABSTRACT

A system for correcting distortion effects in a distorted image includes a memory controller for reading pixels (corresponding to a subset region in a destination image) of the distorted image from a system memory to local memory. A look-up table stores an offset and interpolation weight for each pixel, and an ALU computes, using stored values only in the local memory, values of each of the pixels in the region in the destination image.

18 Claims, 7 Drawing Sheets

(56) References Cited

OTHER PUBLICATIONS

Korean Language—1st Office Action issued in Korean Patent Application Serial 10-2014-7000431 mailed Jun. 22, 2015, 7 pages.

English Language—Summary of 1st Office Action issued in Korean Patent Application Serial 10-2014-7000431 mailed Jun. 22, 2015, 2 pages.

* cited by examiner

WIDE-ANGLE LENS IMAGE CORRECTION

TECHNICAL FIELD

Embodiments of the invention generally relate to the correction of distortion effects introduced into an image by a lens; in particular, a wide-angle lens.

BACKGROUND

A wide-angle or "fish-eye" lens allows capture of a greater field of view than a normal lens (which does not expand or contract the field of view) but at the expense of some distortion in the captured image. This distortion, known alternatively as radial, barrel, or fish-eye distortion, causes the magnification of the image to decrease as the distance from the center of the image increases. Thus, a point near the center of the image may have little or no distortion while a point at the edge of the image may have significant distortion. While the distortion is undesirable, a wide-angle lens may be useful in applications requiring more visual information (i.e., a wider visual field of view) than a normal lens is capable of capturing. Other types of lenses may similarly be useful in different applications, but may similarly introduce distortion into an image.

Wide-angle lenses may therefore be used in applications such as vehicle-mounted proximity-detection systems and security cameras. These applications often must rapidly analyze an incoming stream of captured images for particular shapes or objects. Correct identification of these objects often requires correction of minute aberrations or distortions in the images captured by the wide-angle lens.

The image correction involves converting the original, hemispherical image (or "source image") presented by the wide-angle lens into a rectilinear image (or "destination image") using a mapping process. Several steps may be required in this process, including (i) analyzing the physical characteristics of the lens to calibrate the amount of distortion introduced thereby; (ii) selecting a set of pixels from the source image, based on the results of the calibration, to fill a corresponding pixel location in the destination image; and (iii) smoothening/interpolating between the selected set of pixels.

The above process is typically performed by a digital-signal processor having only a limited amount of on-chip memory. Thus, a larger, external memory may be needed to hold large images captured by the wide-angle lens. The access time of this external memory is often much slower than the smaller on-chip memory. Existing methods cache data locally (i.e., on-chip) to circumvent the slow access of external memory by, for example, dividing the large external memory into pages and mapping the pages to cached sections of on-chip memory. Because the memory-access pattern involved in the distortion correction is random, however, it results in cache misses that increase the overall processing time. Another approach brings the required set of source image pixels from the slower off-chip memory to the faster on-chip memory for processing using, e.g., a data memory access engine. For each pixel, however, the setup time of this engine is huge compared to the processing time. These generic solutions are not well-suited to the particular challenges of using commonly available hardware to correct image distortion. Thus, a need exists for quickly and efficiently correcting distortion in a wide-angle image given the limitations of digital-signal processors.

SUMMARY

In general, various aspects of the systems and methods described herein include correcting distortion in a wide-angle image without requiring multiple, random accesses to external or system memory. Instead, a subset of a destination image is identified, and a portion of the wide-angle image corresponding to the subset of the destination image is read into local memory. Using only the local memory, the pixels in the destination image are computed; a look-up table may be used to facilitate these computations. As a result, data-access operations are reduced, speeding overall processing without increasing on-chip memory requirements.

In one aspect, a method for correcting a distortion effect in a distorted image includes selecting a subset region of a destination image. A plurality of pixels of the distorted image corresponding to the region in the destination image is identified based on a predetermined offset. Pixels from the corresponding region of the distorted image are read into local memory from system memory. The distortion is reversed by computing, using stored values only in the local memory, revised values of each of the pixels in the region of the destination image. The computed values are written into system memory.

In one embodiment, the destination image is constructed using the computed values in system memory. Reversing the distortion may include interpolating between pixels in the distorted image. Selecting the subset region may include identifying a size of the local memory. The offset may be determined by, for example, analyzing a property of a lens that produced the distorted image. Interpolating between pixels in the distorted image may include weighing the pixels based at least in part on predetermined weights. Computing values of each of the pixels may include referencing a look-up table. The distortion effect may be symmetric and the values in the look-up table may correspond to only one quadrant of the distorted image.

In another aspect, a system for correcting a distortion effect in a distorted image includes a local memory for storing image pixel data. A memory controller reads, from the distorted image, a plurality of pixels corresponding to a subset region in the destination image into the local memory from a system memory. A look-up table stores, for each pixel in the destination image, an offset and interpolation weight. An ALU computes, using stored values only in the local memory, values of each of the pixels in the region of the destination image by interpolating, using the look-up table, between pixels in the distorted image.

In one embodiment, a calibration module calibrates the distorted image. The offset may be stored as a 16-bit integer and the interpolation weight may be stored as a 1.7 fixed-point number. System memory may store the distorted image, and the look-up table may include a portion of the local memory. The distorted image may include data from a vehicle-mounted camera or a security camera. The ALU may include a fixed-point number processor for computing the values of the pixels of the destination image and/or a shifter for converting a 1.7 fixed-point number into a 1.15 fixed-point number.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
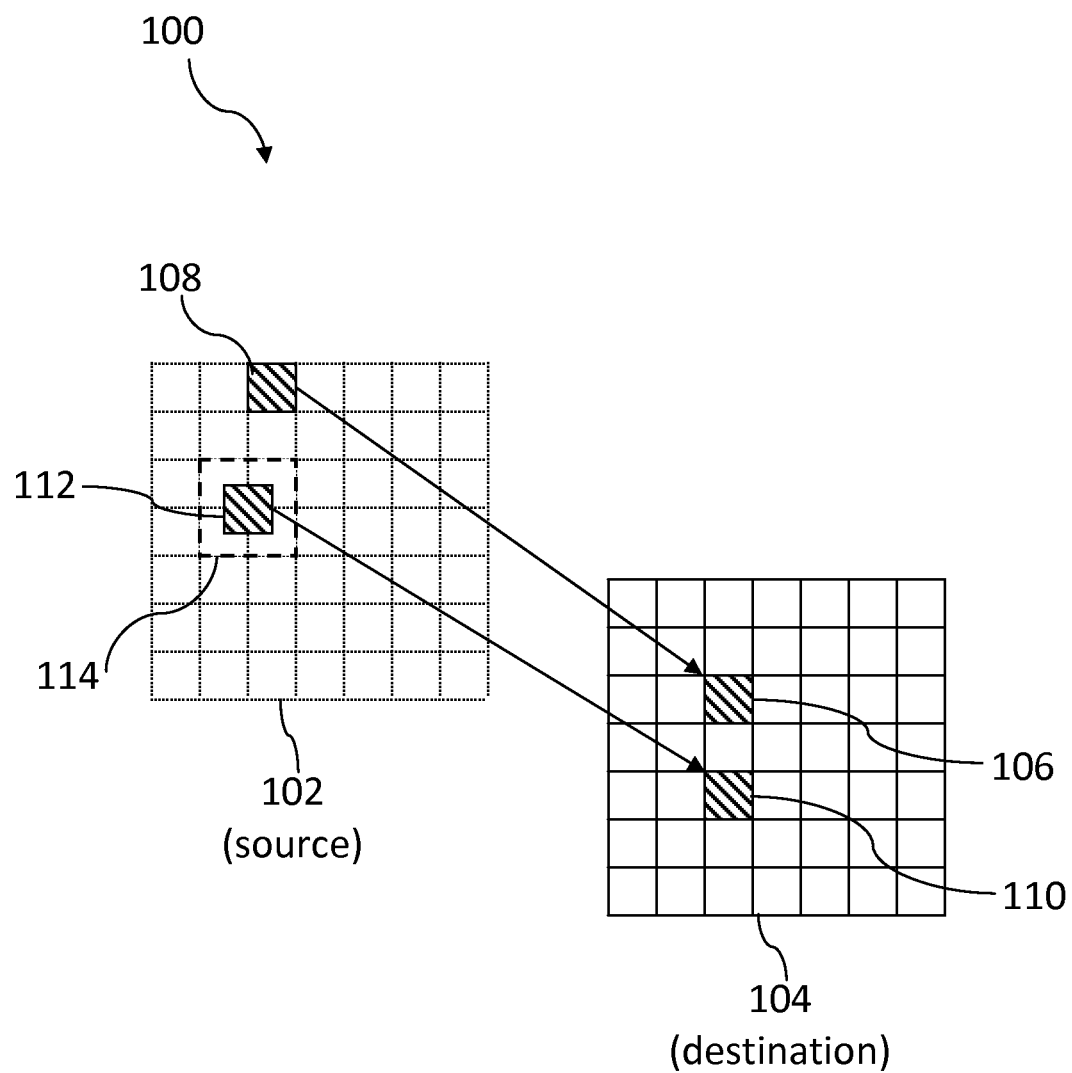
FIG. 1 is an illustration of an exemplary wide-angle image and a corresponding corrected image in accordance with an embodiment of the invention.

Described herein are various embodiments of methods and systems for correcting distortion in a wide-angle image. FIG. 1 is a diagram 100 illustrating a correction of distorted pixels in a wide-angle source image 102 by mapping them into a rectilinear destination image 104 in a manner that reverses the distortion (based on the optical properties of the wide-angle lens). In the simplest case, a first destination pixel 106 corresponds precisely to a first source pixel 108, and correcting the distortion involves merely shifting the distorted source pixel 108 into its undistorted position 106. More commonly, however, a destination pixel 110 does not correspond exactly to a source pixel 112; in this case, the destination pixel 110 is computed as the interpolation between the four pixels 114 surrounding a distorted location 112 in the source image 102. The interpolation is based on the fractional composition of the source location 112 in both the x and y dimensions in relation to the four background pixels 114.

In this manner, each pixel in the destination image 104 may be assigned a corresponding location in the source image 102. Pixels near the center of the destination image 104 may be assigned a location at or very near the center of the source image 102; other pixels in the destination image 104 may be assigned locations near or far from the center of the source image 102, depending on the amount of distortion present at that location. For example, a point in the source image 102 having severe distortion may be shifted more in the destination image 104 than a point with only moderate distortion.

Figure 2:
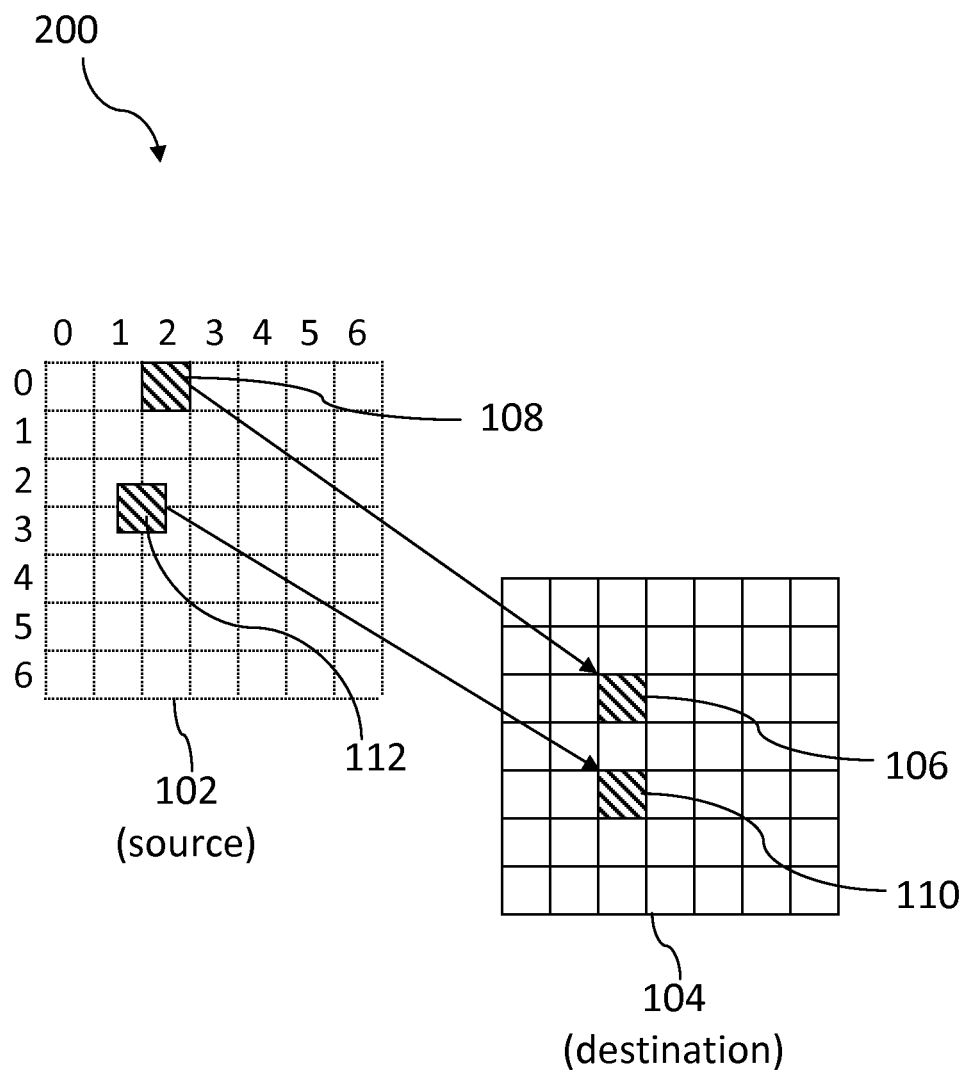
FIG. 2 is an illustration of a coordinate system for correcting wide-angle lens distortion in accordance with an embodiment of the invention.

One method of specifying the amount of shifting necessary for each pixel in the destination image is illustrated in FIG. 2. The source image 102 is designated with x-axis and y-axis coordinates, and the origin point of the axes is the upper-left corner of the source image 102. The first pixel 106 in the destination image 104, which happens to correspond exactly to a pixel 108 in the source image 102, is assigned the (x,y) coordinate pair (2,0). The second pixel 110 in the destination image 104, which does not correspond to a single pixel in the source image 102, is assigned the (x,y) coordinate pair (1.400, 2.500) to reflect its corresponding point 112 in the source image 102. The whole parts (1, 2) of the (x,y) coordinate pair (1.400, 2.500) signify the pixel location in the source image 102 in which the upper-left corner of the location 112 resides, and the fractional parts (0.400, 0.500) of the (x,y) coordinate pair (1.400, 2.500) signify the offset of the location 112 within the (1,2) pixel (i.e., specified on a granularity smaller than that of the pixel grid). The coordinate system shown in FIG. 2 is just one example of a system for specifying the relationship between pixels in the destination image 104 and corresponding locations in the source image 102; the current invention is not limited to any particular system. For example, the pixel location in the source image 102 may be specified as an integer offset from the (0,0) pixel instead of as an absolute (x,y) coordinate.

The amount of distortion in the source image 102, and hence the values for each of the (x,y) coordinate pairs for the pixels in the destination image 104, depends upon the optical characteristics of the wide-angle lens used to create the source image 102. Detecting the optical characteristics of a lens and determining the distortion affecting each pixel is a process well-known to those of skill in the art, and the current invention is not limited to any particular technique or system. In one embodiment, a live feed from the camera and/or lens is read continuously by a camera calibration module. Different test patterns (e.g., "chess boards") are captured by the camera. Using the regular shape of the chess board patterns and some undistorted parts in the captured image (e.g., the center of the image), the calibration module estimates the amount of distortion using, e.g., polynomial fitting. The estimated distortion profile may yield intrinsic parameters of the camera/lens (e.g., x-focal length ("fx"), y-focal length ("fy"), and principal point ("cx, cy")) and extrinsic parameters of the camera/lens (e.g., radial distortion coefficients ("k1," "k2," and "k3") and tangential distortion coefficients ("p1" and "p2"). These parameters may be used to compute the values of the source pixel/location coordinates for each destination pixel.

Figure 3:
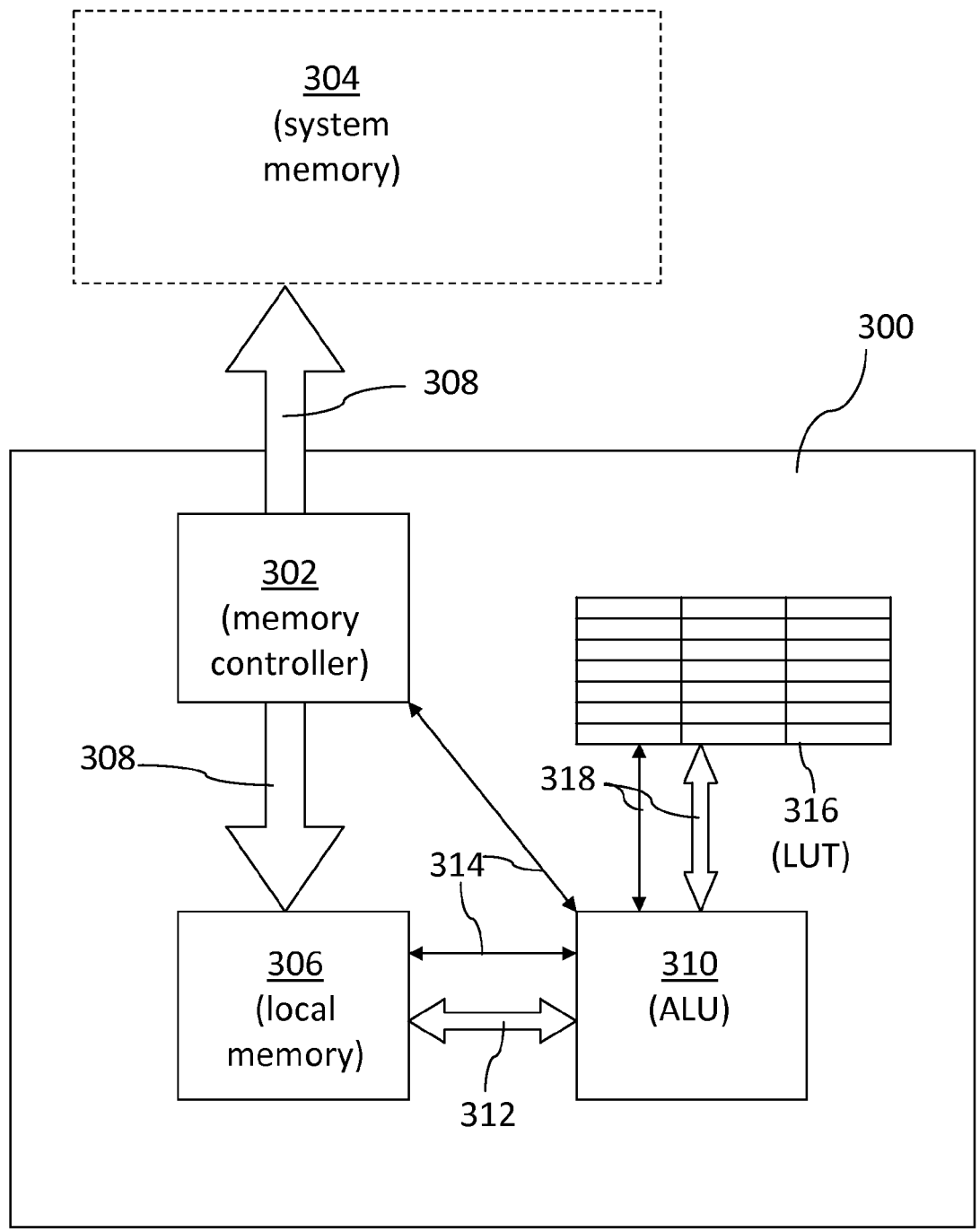
FIG. 3 is a block diagram of a system for correcting a wide-angle image in accordance with an embodiment of the invention.

One embodiment of a system 300 for correcting distortion in a wide-angle image appears in FIG. 3. A memory controller 302 reads data from a system memory 304 and writes a selected subset of data in the system memory 304 to a local memory 306 via a memory bus 308. The memory controller 302 may also write data read from the local memory 306 back into the system memory 304. The system 304 and local 306 memories may be any random-access memory array known in the art, such as a dynamic or static random-access memory; in general, the access and read/write times of the local memory 306 are faster than those of the system memory 304.

An ALU 310 reads and writes data from and to the local memory 306 via a bus 312. The ALU 310 may communicate with the memory controller 302 and/or the local memory 306 via control signals 314. The ALU 310 may be any computational engine, circuit, or combination or collection thereof, and the current invention is not limited to any particular implementation of the ALU 310. A look-up table ("LUT") 316 may be used, as described in greater detail below, to store data relating to the derived properties of the wide-angle lens. The ALU 310 may use the data stored in the LUT 316, via data/control signals 318, to facilitate processing of the wide-angle source image.

Figure 4:
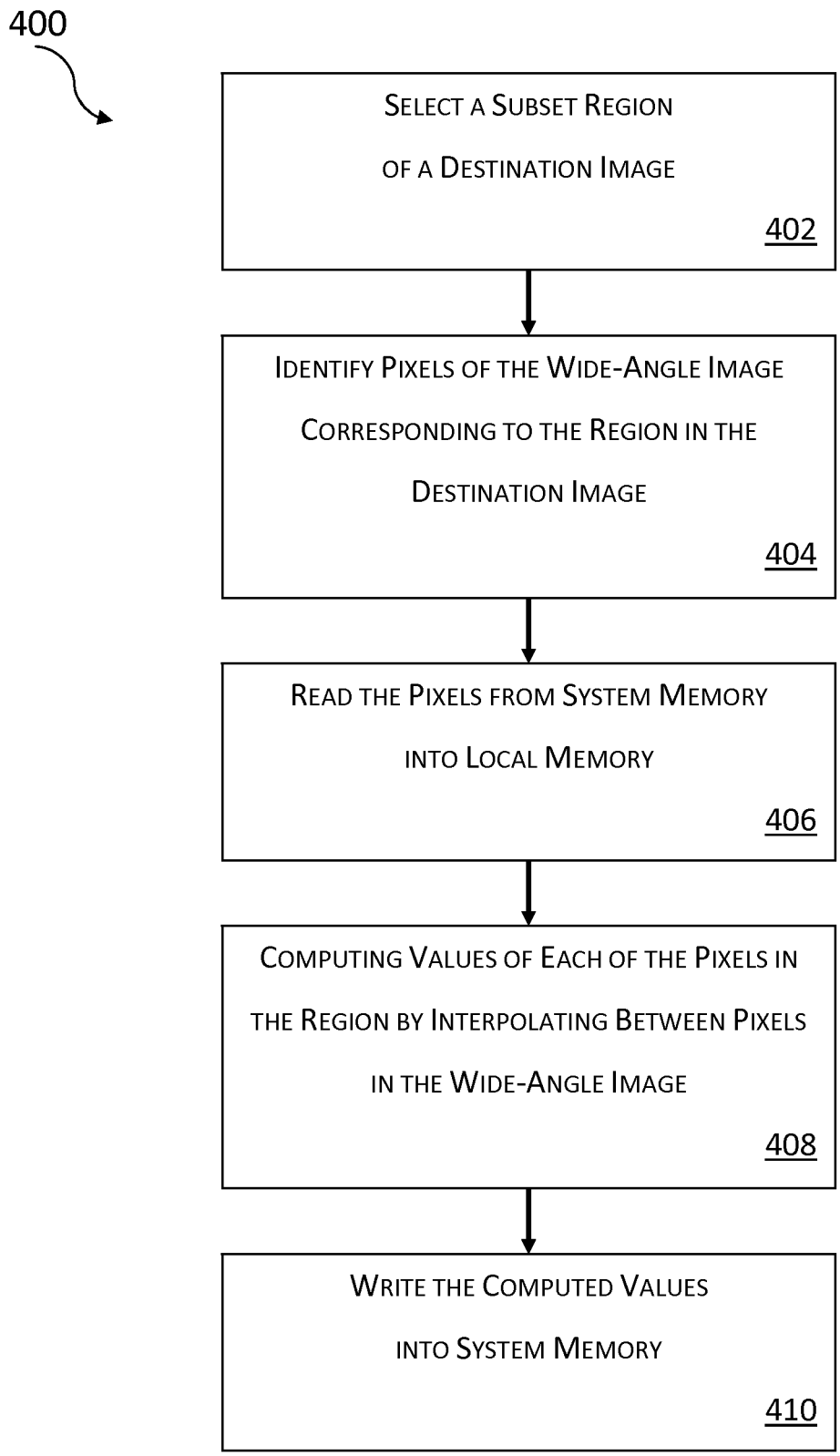
FIG. 4 is a flowchart illustrating a method for correcting a wide-angle image in accordance with an embodiment of the invention.

With reference to FIG. 4, the flowchart 400 illustrates a representative method for using the system 300 to correct distortion in a wide-angle image. In a first step 402, a subset region of the destination image is selected. In one embodiment, the system 300 divides the pixels of the destination image into subgroups (also known as macroblocks). The size of each destination macroblock (and, thus, the total number of macroblocks for a particular image size) generally depends on the capacity or size of the local memory 306. Each destination macroblock corresponds to a macroblock in the source image, the size of which may be different from the size of the destination macroblock. The source macroblock size may vary depending on the amount of distortion present in each destination macroblock. The offset of each pixel in a destination macroblock is determined (by, for example, analyzing the lens calibration data), and the size of the source macroblock is selected to encompass the x,y coordinates of each offset. For example, the width of the source macroblock may be determined by subtracting the x-value of the minimum x-offset ($X_{min}$) from the x-value of the maximum x-offset ($X_{max}$), and the height of the source macroblock may be determined by subtracting the y-value of the minimum y-offset ($Y_{min}$) from the y-value of the maximum y-offset ($Y_{max}$).

Once the macroblock size is determined, one of the macroblocks of the destination image is selected, and in a second step 404, pixels in the source image corresponding to the macroblock are identified, as explained below. In one embodiment, the pixels in the source image lie within a macroblock in the source image of the same size as the selected macroblock in the destination image. In alternative embodiments, the pixels in the source image lie within a macroblock in the source image of greater or smaller size than the selected macroblock. The size of the source macroblock may depend on the size of destination macroblock the size of the local memory 306, and/or the parameters (e.g., amount of distortion) of the lens. The location of the pixels selected in the source image may be determined by the offset of a pixel in the destination image, as that offset was determined during the calibration phase. For example, the offset of the pixel in the top-left corner of the destination macroblock may be used to determine the location of the top-left corner of the source macroblock; the rest of the pixels in the source macroblock are determined in accordance with the offsets of the rest of the pixels in the destination macroblock.

Figure 5:
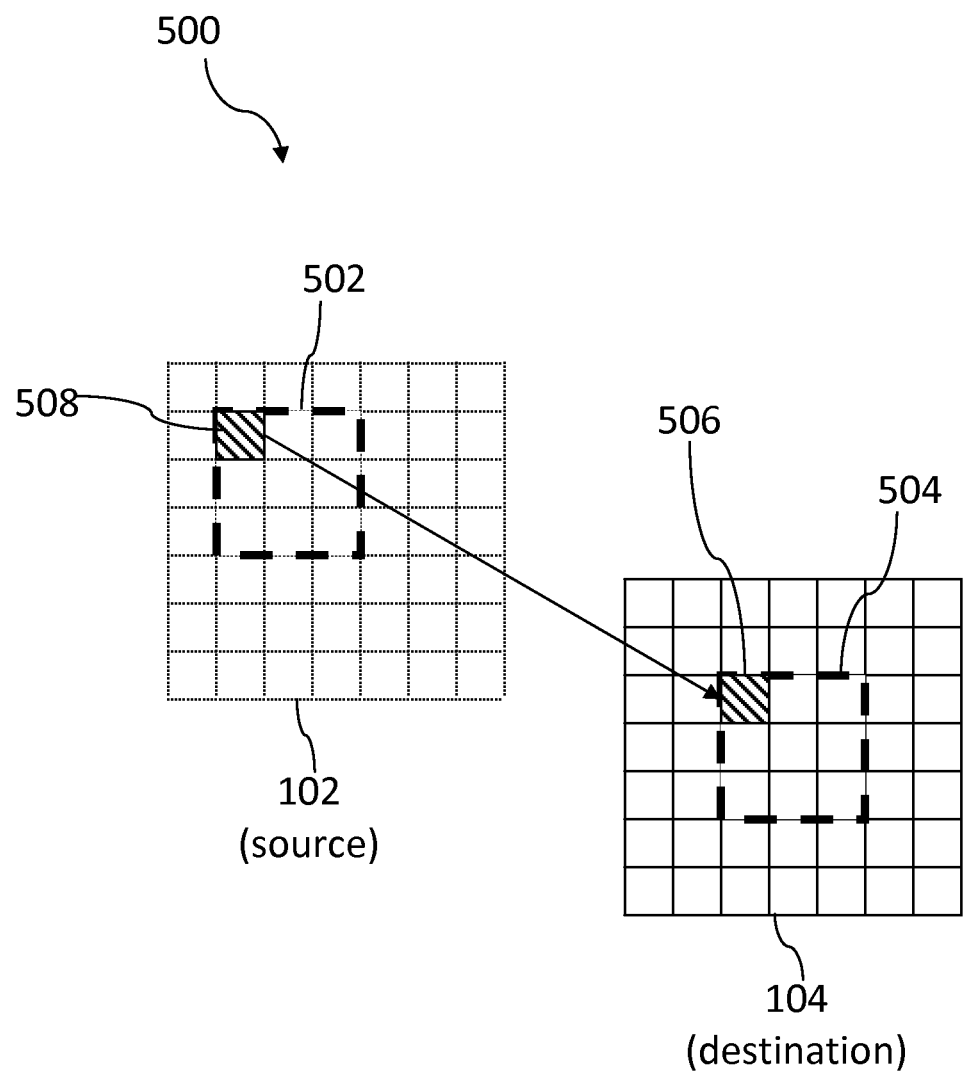
FIG. 5 is an illustration of source and destination macroblocks in accordance with an embodiment of the invention.

FIG. 5 illustrates an example 500 of a macroblock 504 in the destination image 104 and a corresponding macroblock 502 in the source image 102. In this example, the destination macroblock 504 is selected, in accordance with the size of the local memory 306, to have a size of 3×3 pixels. The source macroblock 502, in this example, is similarly sized at 3×3 pixels, but the source macroblock may be greater in size than the destination macroblock; each source macroblock may be a different size, depending on the lens distortion parameters for that macroblock. The pixel 506 in the upper-left hand corner of the destination macroblock 504 is examined, and its offset is found to correspond to a different pixel 508 in the source image 102. The source macroblock is thus positioned such that the source pixel 508 is disposed in the upper-left corner of the source macroblock 502.

In an alternative embodiment, instead of determining a size for each source macroblock, a fixed size ($W_{max}, H_{max}$) is used for all source macroblocks. The fixed size is selected to cover the worst-case (i.e., largest) source macroblock (i.e., Wmax>MAX(Xmax−Xmin) and Hmax>MAX(Ymax−Ymin) for all macroblocks. For non-worst-case source macroblocks that do not require the fixed size, one or more cushions of size M may be placed in the image to fill the remaining space in the x and/or y dimensions; the top-left pixel source address may be considered as reference after adding the cushion. The offsets for each pixel may be stored in same way and same procedure may be followed to do the interpolation.

Returning to the method 400 in FIG. 4, in a third step 406, the pixels corresponding to the macroblock in the source image are read into the local memory 306. In the above example, the nine pixels in the 3×3 source macroblock 502 are read into the local memory 306. The local memory 306 is large enough to accommodate all of the pixels simultaneously. Each pixel may include data relating to its graphical properties, such as color, brightness, intensity, alpha level, etc.

In a fourth step 408, the values of the pixels in the macroblock in the destination image are computed using the information stored only in the local memory (e.g., the pixels in the source macroblock). Additional accesses to system memory, other than the initial batch access to read in the pixels in the source macroblock, are not required to process the destination macroblock.

As described briefly above, for each pixel in the destination macroblock, an offset corresponding to the amount of distortion present at that pixel is read. The offset includes an x-value corresponding to the amount of distortion in the x-dimension and a y-value corresponding to the amount of distortion in the y-dimension. As mentioned above, the x- and y-offsets typically contain fractional values, because the total offset for each destination pixel—as computed in accordance with the lens calibration procedure—is not likely to align precisely to a pixel boundary in the source image. In accordance with the method described below, the value of the pixel in the destination image is interpolated between the four pixels in the source image closest to the offset location in the source image.

Figure 6:
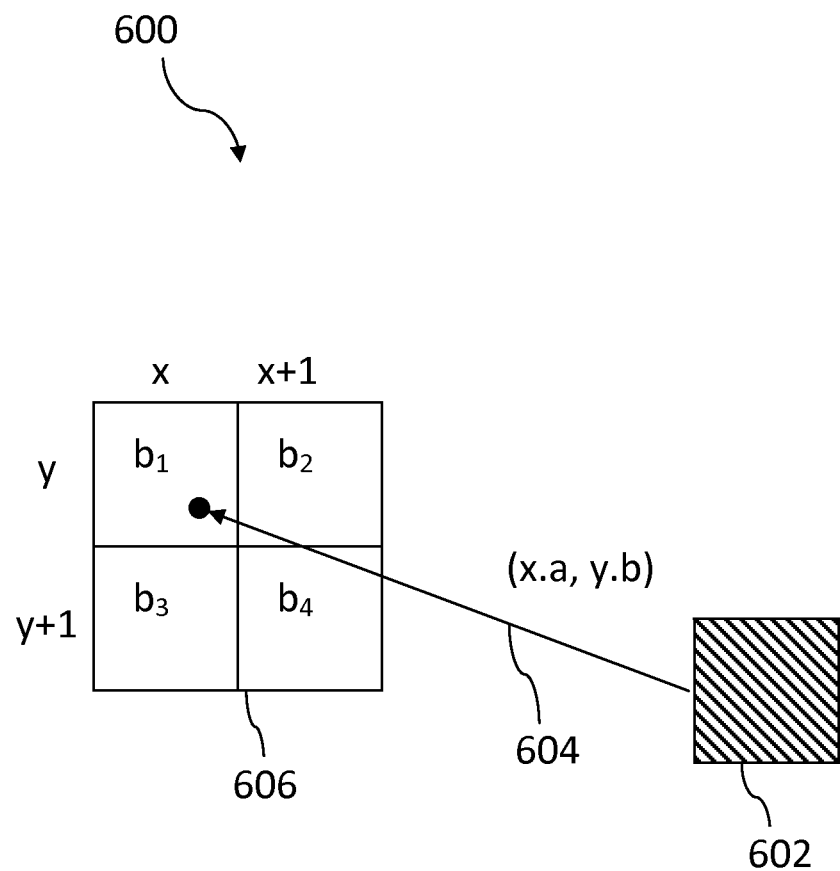
FIG. 6 is an illustration of pixel interpolation in accordance with an embodiment of the invention.

FIG. 6 illustrates an exemplary interpolation operation 600. A destination pixel 602 has an offset 604 of (x.a, y.b), wherein x and y are the whole-number parts of the offset and a and b are the fractional parts. Four pixels $b_1$, $b_2$, $b_3$, $b_4$ are identified in the source image 606 by determining the first pixel $b_1$ in which the offset coordinates (x.a, y.b) lie and selecting the pixel $b_2$ adjacent to, and the pixels $b_3$ and $b_4$ below, the first identified pixel $b_1$. An x-interpolation factor, nHorz, is defined as the fractional part of the x-offset (i.e., "a"), and a y-interpolation factor is defined as the fractional part of the y-offset (i.e., "b"). The inverses of these interpolation factors are determined in accordance with the following equations.

$$n\text{Horz}' = 1 - n\text{Horz} \quad (1)$$

$$n\text{Vert}' = 1 - n\text{Vert} \quad (2)$$

The value of the destination pixel is determined, using the values of the pixels $b_1$, $b_2$, $b_3$, $b_4$ from the source image 606 and the interpolation factors, using the following equation.

$$DestinationPixelValue = \{(b_1 \times n\text{Horz}') + (b_2 \times n\text{Horz})\} \times n\text{Vert}' + \{(b_3 \times n\text{Horz}') + (b_4 \times n\text{Horz})\} \times n\text{Vert} \quad (3)$$

In one embodiment, a look-up table (such at the LUT 316 discussed above with reference to FIG. 3) is used to facilitate processing of the pixel values within the destination macroblock. The look-up table may hold, for each destination macroblock, the external memory address calculated based on maximum deviation of reference pixel (e.g., the pixel in the upper-left corner) within its corresponding source macroblock. The look-up table may further hold, for each destination macroblock, (i) the relative offsets from the reference pixel of the rest of the pixels in the destination macroblock and (ii) the horizontal and vertical interpolation weights for each pixel in the destination macroblock.

Thus, when a new destination macroblock is selected for processing, the look-up table may be consulted to determine the locations in external memory of the pixels corresponding to the reference pixel and the rest of the pixels (using the stored relative offsets) in the source macroblock, which then may be read into local memory. The relative offsets may be determined by the equation:

$$\text{Offset}_i = [(Y_i - Y_{min}) \times (\text{Width\_of\_Source\_Macroblock})] + (X_i - X_{min}) \quad (4)$$

wherein $X_i$ and $Y_i$ are the coordinates of the current pixel and $X_{min}$ and $Y_{max}$ are the coordinates of the minimum offset for the current macroblock.

Figure 7:
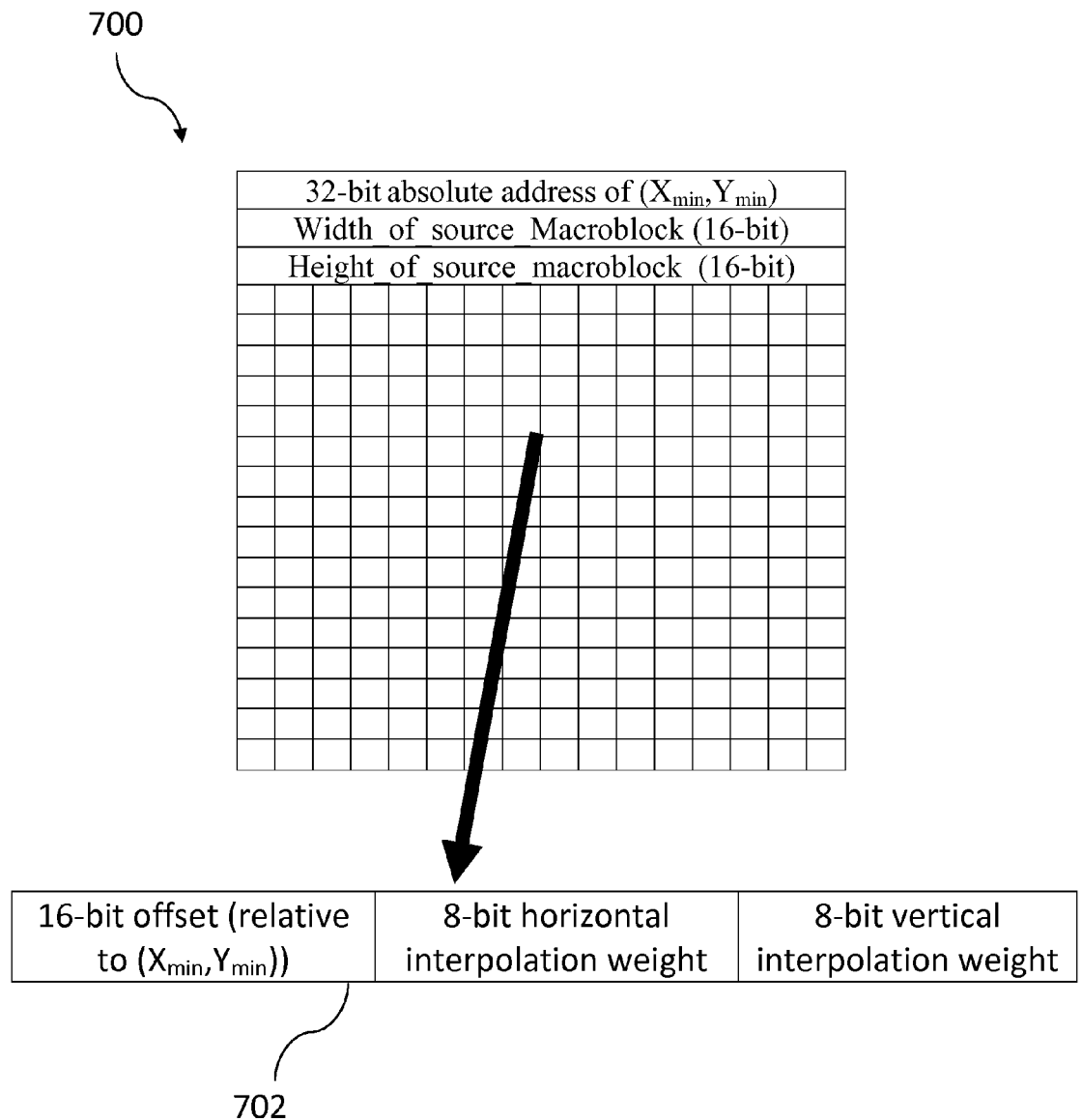
FIG. 7 is an illustration of a look-up table in accordance with an embodiment of the invention.

The look-up table may also be used during processing of the pixels in the destination macroblock. The address of the destination pixel may be applied to the look-up table to yield the offset of that pixel (which identifies the four pixels $b_1$, $b_2$, $b_3$, $b_4$, held in the local memory, in the source macroblock) and the interpolation factors for that pixel. This information may then be used, in accordance with the above equation (3), to determine the pixel value. One embodiment 700 of a look-up table is illustrated in FIG. 7. In this embodiment, a 16-bit offset (i.e. Offset, in accordance with the above equation (4)) and a 1.7 fixed-point version of an interpolation weight (i.e. $a_i$ and $b_i$) are packed in a 32-bit word 702 and stored for every destination pixel $X_i$, $Y_i$ in the destination macroblock. A similar look-up table may be constructed for each destination macroblock.

In a fifth step 410, the computed pixel values are written back to system memory. In one embodiment, all of the pixel values in the destination macroblock are first determined and then written to system memory at once; alternatively, subsets of the computed pixels are written to system memory during processing of the destination macroblock.

The fractional values used in the above computations (e.g., the interpolation factors) may be stored in any floating-point number format known in the art; the current invention is not limited to the use of any particular format. In one embodiment, however, eight-bit versions of the interpolation factors nHoriz and nVert are stored in the look-up table in 1.7 fixed-point format to save storage space and are converted, using shift operations, to 1.15 fixed-format when used to compute the pixel values in the destination image. In this embodiment, nHoriz' and nVert' may be computed by subtracting nHoriz and nVert, respectively, from the 1.15 fixed-point value of 1 (i.e., 0x7FFF). The relative offset of each pixel relative to the reference pixel may be stored in the look-up table as a sixteen-bit number.

In one embodiment, the distortion in the wide-angle lens is symmetric around the center of the source image. In this embodiment, the offsets and interpolation factors for only one quadrant of the source image are stored in the look-up table, thereby reducing the size of the look-up table by a factor of four. The offsets and interpolation factors of the remaining three quadrants of the source image may be derived from those of the first by exploiting the symmetry of the wide-angle lens.

The data independency between different destination macroblocks may be exploited in parallel processing units (e.g., systems with multiple processors or processors having multiple cores). The pixels of each destination macroblock may be computed in parallel, and the results of the parallel computations may be combined into a single destination image once they are complete.

In one embodiment, the systems and methods describe above yield a processing-time reduction of a factor of 4 compared to existing methods. In another embodiment, the offsets and the interpolation factors are packed into four-byte memory locations, thereby giving a storage space reduction of 50%. Increasing the size of the destination macroblock, if the distortion in the source image and the size of the local memory permits, may further increase the performance of the system. For example, increasing the destination macroblock size from 16×16 to 24×24 may increase the performance by approximately 16%.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for correcting a distortion effect in a distorted image, the method comprising:
    selecting a destination macroblock in a destination image based on a size of a local memory;
    determining an x-coordinate offset and a y-coordinate offset for each pixel in the destination macroblock;
    identifying a source macroblock in the distorted image that corresponds with the destination macroblock, wherein a size of the source macroblock is selected to encompass the x-coordinate offset and the y-coordinate offset of each pixel in the destination macroblock;
    reading into local memory from system memory pixels corresponding to the source macroblock in the distorted image;
    reversing the distortion by computing, using information associated with the pixels stored in the local memory, revised values of each pixel in the destination macroblock in the destination image; and
    writing the computed values into system memory.

2. The method of claim 1, further comprising storing information associated with the destination macroblock in a look-up table, wherein the storing includes:
    storing a system memory address of a reference pixel associated with a minimum x-coordinate and a minimum y-coordinate of the source macroblock;
    for each pixel, storing an offset relative to the reference pixel, a horizontal interpolation weight, and a vertical interpolation weight.

3. The method of claim 2, further comprising determining the relative offset for each pixel in the destination macroblock, wherein the relative offset for a given pixel in the destination macroblock can be represented by:

$$\text{OFFSET}_i = (Y_i - Y_{min}) * \text{Width\_of\_Source\_Macroblock} + (X_i - X_{min}),$$

wherein $X_i$ and $Y_i$ respectively represent an x-coordinate and a y-coordinate for the given pixel in the destination macroblock, and $X_{min}$ and $Y_{min}$ respectively represent an x-coordinate minimum offset and a y-coordinate minimum offset for the destination macroblock.

4. The method of claim 2, determining a location in system memory of the pixels corresponding to the source macroblock using the look-up table, wherein the location of the reference pixel is indicated by the system memory address and the location of other pixels in the source macroblock is determined using the stored relative offsets.

5. The method of claim 1, further comprising, from the x-coordinate offsets and the y-coordinate offsets determined for the pixels of the destination macroblock, determining an x-coordinate minimum offset, a y-coordinate minimum offset, an x-coordinate maximum offset, and a y-coordinate maximum offset, wherein a width of the source macroblock is determined by subtracting the x-coordinate maximum from the x-coordinate minimum and a height of the source macroblock is determined by subtracting the y-coordinate maximum from the y-coordinate minimum.

6. The method of claim 5, wherein determining the offset comprises analyzing a property of a lens that produced the distorted image.

7. The method of claim 1, wherein interpolating between pixels in the distorted image comprises weighing the pixels based at least in part on predetermined weights.

8. The method of claim 2, wherein computing revised values of each of the pixels in the destination macroblock comprises, for each pixel, applying an address of the pixel to the look-up table to yield the relative offset for that pixel to identify associated pixels in the source macroblock.

9. The method of claim 8, wherein the distortion effect is symmetric and wherein the values in the look-up table correspond to only one quadrant of the distorted image.

10. A system for correcting a distortion effect in a distorted image, the system comprising:
   a local memory for storing image pixel data;
   a memory controller for reading, from the distorted image, pixels corresponding to a source macroblock in the distorted image into the local memory from a system memory, wherein the source macroblock corresponds with a destination macroblock in a destination image, a size of the destination macroblock selected based a size of the local memory;
   a look-up table for storing an external memory address of a reference pixel associated with a minimum x-coordinate and a minimum y-coordinate of the source macroblock, and for each pixel in the destination macroblock, an offset relative to the reference pixel and interpolation weight, wherein the source macroblock is identified based on the offset of pixels in the destination macroblock;
   an ALU for computing, using information associated with the pixels stored in the local memory, values of each pixel in the destination macroblock in the destination image by interpolating, using the look-up table, between pixels in the distorted image.

11. The system of claim 10, further comprising a calibration module for calibrating the distorted image.

12. The system of claim 10, wherein the offset is stored as a 16-bit integer and the interpolation weight is stored as a 1.7 fixed-point number.

13. The system of claim 10, further comprising system memory for storing the distorted image.

14. The system of claim 10, wherein the look-up table comprises a portion of the local memory.

15. The system of claim 10, wherein in the distorted image comprises data from a vehicle-mounted camera or a security camera.

16. The system of claim 10, wherein the ALU comprises a fixed-point number processor for computing the values of the pixels of the destination image.

17. The system of claim 10, wherein the ALU comprises a shifter for converting a 1.7 fixed-point number into a 1.15 fixed-point number.

18. A system for correcting a distortion effect in a distorted image, the system comprising:
   means for determining an x-coordinate offset and a y-coordinate offset for each pixel in a destination macroblock, wherein a size of the destination macroblock depends on a size of a local memory of the system;
   means for identifying a source macroblock that corresponds with the destination macroblock, wherein a size of the source macroblock is selected to encompass the x-coordinate offset and the y-coordinate offset of each pixel;
   a look-up table for storing information associated with the destination macroblock relative to the source macroblock, including a memory address of a reference pixel associated with a minimum x-coordinate and a minimum y-coordinate of the source macroblock, and for each pixel, an offset relative to the reference pixel and an interpolation weight; and
   means for determining a value for each pixel in the destination macroblock that reverses the distortion using the look-up table.

* * * * *